Nov. 20, 1962

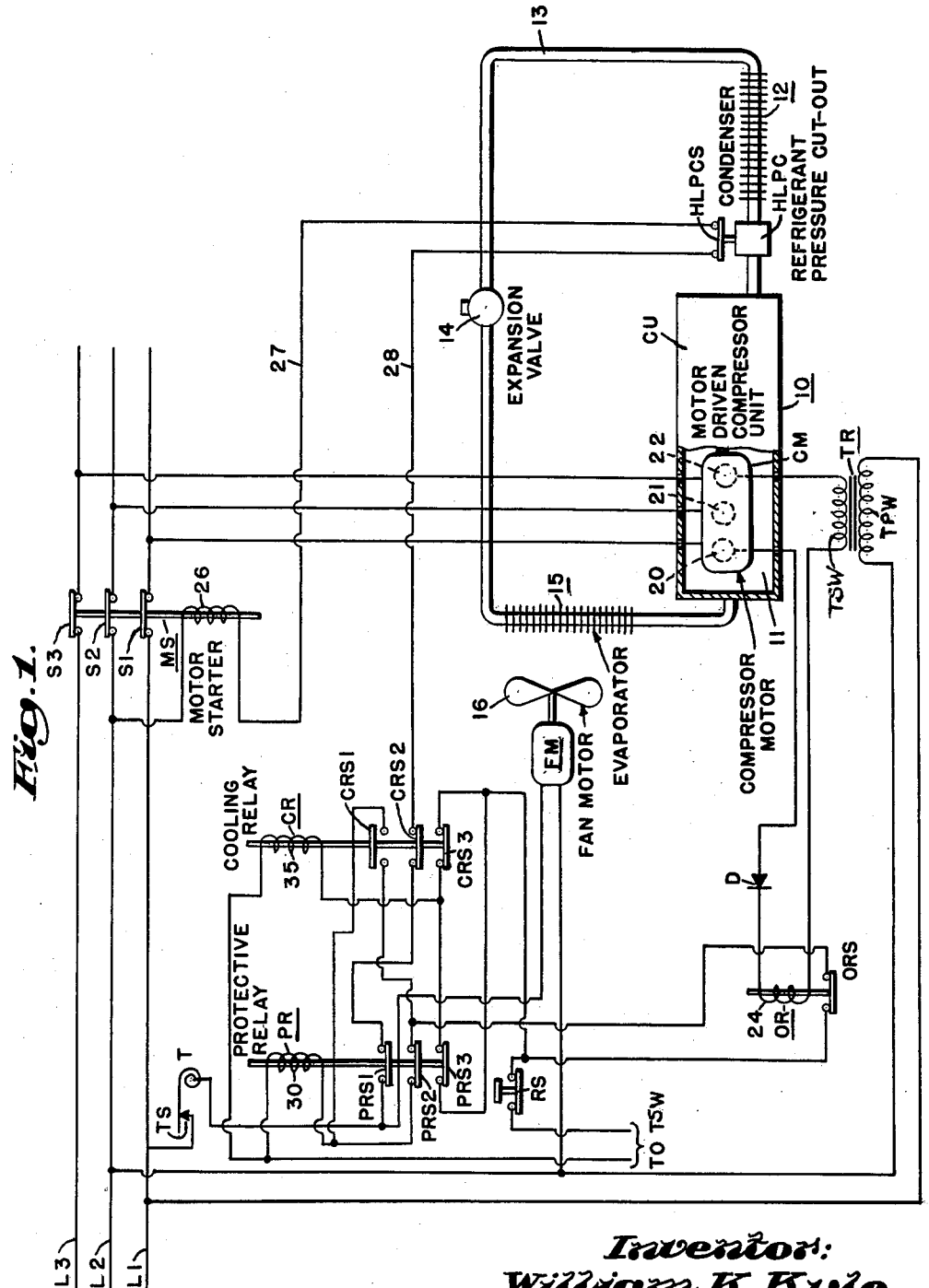

W. K. KYLE 3,064,444

SAFETY CONTROL CIRCUITS FOR THE MOTORS
OF REFRIGERANT COMPRESSORS

Filed Nov. 30, 1959

Inventor:
William K. Kyle,
by Robert J. Palmer
Attorney

United States Patent Office
3,064,444
Patented Nov. 20, 1962

3,064,444
SAFETY CONTROL CIRCUITS FOR THE MOTORS OF REFRIGERANT COMPRESSORS
William K. Kyle, Staunton, Va., assignor to Westinghouse Electric Corporation, East Pittsburgh, Pa., a corporation of Pennsylvania
Filed Nov. 30, 1959, Ser. No. 856,188
3 Claims. (Cl. 62—161)

This invention relates to safety controls for motors which drive refrigerant compressors, and relates more particularly to safety controls for motors which are contained within and which drive hermetically sealed refrigerant compressors.

As disclosed in the U.S. Patent No. 2,891,386 of W. R. Winter, refrigerant compressors used in air conditioning units and systems usually have safety switches operated by refrigerant pressure cut-outs, and by overload relays. Some such compressors may have other safety switches such as those of thermostats exposed to discharge gas temperature. Automatic starting of a compressor motor having such controls is not practical for if this were done, the unit might operate intermittently and suffer damage. The control circuit of said Winter patent includes a reset switch and reset circuit for restarting such a compressor motor after a safety control has stopped the motor.

This invention is an improvement on the circuit of the Winter patent in that the controls are simplified and adapted for remote control, and in that an improved protective circuit for the motors of hermetically sealed compressors is provided.

An object of this invention is to improve safety control circuits for motors which drive refrigerant compressors.

Another object of this invention is to improve safety control circuits for the motors which drive hermetically sealed refrigerant compressors.

This invention will now be described with reference to the annexed drawings, of which:

FIG. 1 is a diagrammatic view of a refrigeration system including a safety control circuit embodying this invention;

Figure 3:
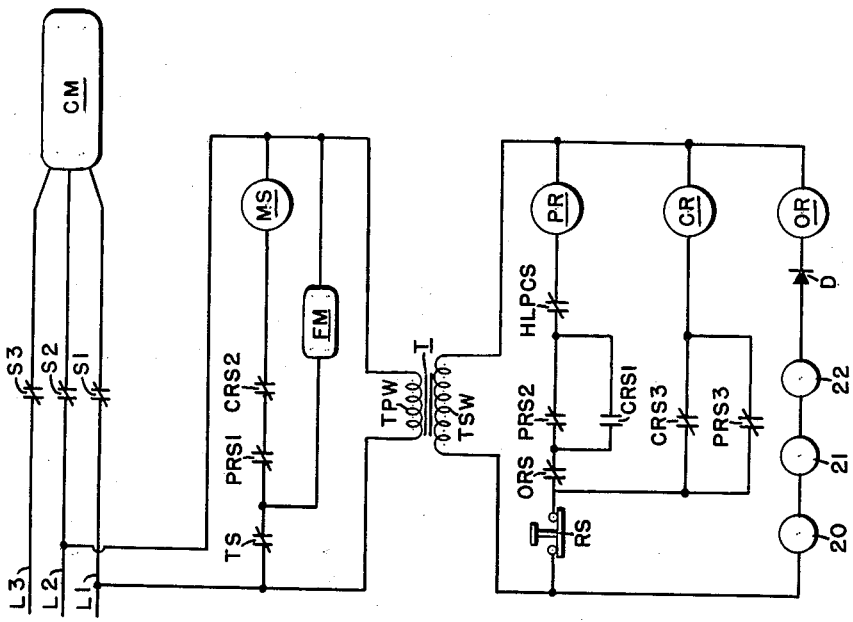
FIG. 3 is a simplified circuit schematic of another control circuit embodying this invention.

A hermetically sealed refrigerant compressor 10 has a compressor unit CU driven by an electric motor CM. The motor CM is enclosed within suction gas passage 11 where it is cooled by refrigerant vapor as disclosed in the U.S. Patent No. 2,283,024 of E. R. Wolfert. The discharge side of the compressor 10 is connected through high-low, refrigerant pressure cut-out HLPC, condenser 12, tubing 13, expansion valve 14 and evaporator 15 to the suction side of the compressor. A fan 16 driven by fan motor FM blows air over the evaporator 15 for cooling such air.

The motor CM is connected through switches S1, S2 and S3 to three-phase supply lines L1, L2 and L3 respectively, these switches being closed by the motor starter MS when its energizing winding is connected to the supply lines L1 and L2 as will be described later. Exposed to the temperature of the motor CM as by being imbedded in its windings or in contact with their surfaces, are semiconductors 20, 21 and 22 which are connected in series with diode D, winding 24 of overload relay OR, and secondary winding TSW of step-down transformer TR, the primary winding of which is connected to the supply lines L1 and L2. The semiconductors are of the positive temperature coefficient of resistance type such as single crystal silicon, PbSe or BaTiO₃, and their electrical resistances increase substantially at the critical temperature of the motor CM. In such hermetically sealed compressors, the critical temperatures of their driving motors usually occur at light loads due to reduced motor cooling at light loads. The electric current drawn by such a motor at such a light load is reduced below that drawn by the motor at normal load so that the usual magnetic or thermal overload relays which respond to excessive motor current, are not suitable for protecting the motor of a hermetic compressor.

Energizing winding 26 of motor starter MS is connected to the supply lines L1 and L2 through the series-connected wire 27, switch HLPCS of the refrigerant pressure cut-out HLPC, switch CRS2 of cooling relay CR, switch PRS1 of protective relay PR, thermostat T, and switch TS of the latter. The thermostat T may be a room or zone thermostat for controlling operation of the compressor. The fan motor FM is shunted across the series connection of the switches PRS1, CRS2 and HLPCS, and the starter winding 26 so that the fan motor can be started when the compressor motor is shut off.

A manually operated, reset switch RS is connected in series with switch ORS of overload relay OR, and the switch PRS2 of the protective relay PR, to the secondary winding TSW of the transformer TR, this series circuit also including the energizing winding 30 of the protective relay. Switch CRS1 of the cooling relay CR which is closed when the cooling relay is deenergized, is shunted across the switch PRS2.

The reset switch RS is also connected in series with switch CRS3 of the cooling relay CR, and the energizing winding 35 of the cooling relay, to the secondary winding TSW. Switch PRS3 of the protective relay PR is shunted across the switch CRS3.

Figure 2:
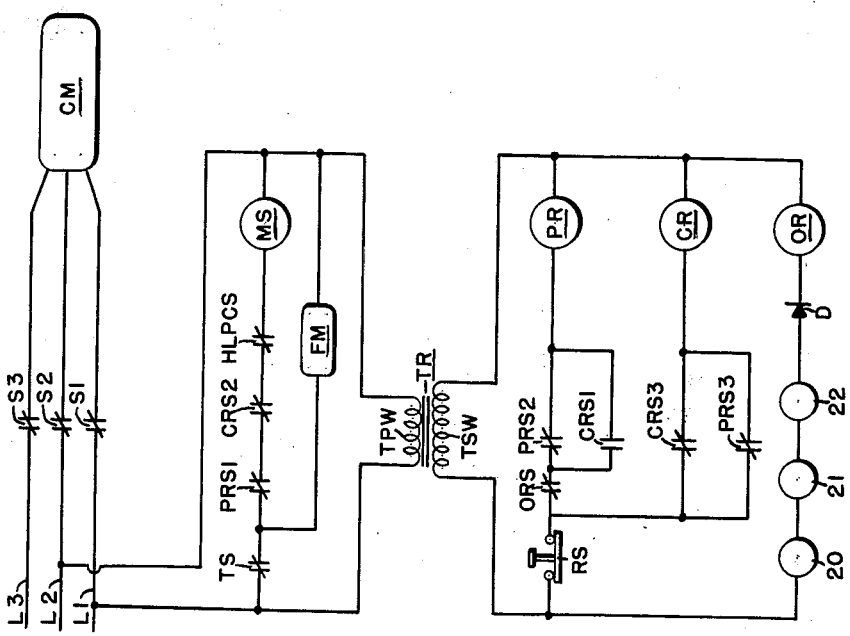
FIG. 2 is a simplified circuit schematic of the control circuit of FIG. 1.

In the operation of FIGS. 1 and 2, when power is off, the relays OR, PR, CR and the magnetic starter MS are deenergized, and their switches, except the switch CRS1 of the cooling relay CR, are open. When power is applied, the overload relay OR will be energized and will close its switch ORS. The protective relay PR will be energized through the series connection of its winding 30, the closed switch CRS1 of the cooling relay, the switch ORS of the overload relay, and the normally closed reset switch RS, across the secondary winding TSW. The now energized protective relay PR will close its switches PRS1, PRS2 and PRS3. The closed switch PRS3 connects the cooling relay winding 35 in series with the reset switch RS across the secondary winding TSW, energizing the cooling relay which opens its switch CRS1 and closes its switches CRS2 and CRS3.

The now closed switches PRS2 and ORS maintain the protective relay PR energized after the cooling relay CR has been energized and has opened its switch CRS1.

Assuming the thermostat switch TS is closed, the compressor motor CM will now be energized through the closed switches TS, PRS1, CRS2 and HLPCS connecting its magnetic starter winding 26 to the supply lines L1 and L2 so that the magnetic starter MS is energized and closes its switches S1, S2 and S3, connecting the motor CM to the supply lines L1, L2 and L3.

The fan motor FM will now be energized through the closed switch TS from the supply lines L1 and L2.

The system of FIGS. 1 and 2 is now in operation, and will remain in operation until the thermostat T opens its switch TS, or one of the safety switches ORS or HLPCS opens. If only the safety switch HLPCS opens, the compressor motor will stop, but the fan motor will continue to operate through the circuit established by the closed thermostat switch TS.

If the safety switch ORS of the overload relay OR opens as a result of the overheating of the compressor motor, the protective relay PR will be deenergized and open its switches. The opening of the switch PRS1 will deenergize the magnetic starter MS which will open its switches S1, S2 and S3 to stop the compressor motor. The opening of the switch PRS2 will open the holding circuit across the switch CRS1. The opening of the switch PRS3 cannot deenergize the cooling relay CR at this time for it remains energized through its switch CRS3 being closed. The switch CRS3 is provided for preventing the cooling relay from being deenergized at this time and closing its switch CRS1 to energize the protective relay PR.

To restart the compressor after the safety switch ORS has shut it down, the reset switch RS would be opened and closed. Opening the switch RS would deenergize the cooling relay CR which would close its switch CRS1 and energize the protective relay PR, assuming the safety switch ORS has closed again, which would then energize the magnetic starter MS as described in the foregoing.

In the system of FIGS. 1 and 2, the safety switch HLPCS is of the automatic reset type, although it could be of the manually reset type.

In the circuit of FIG. 3, the safety switch HLPCS is in the reset circuit in series with the overload switch ORS instead of being in the circuit of the magnetic starter, requiring that the switch HLPCS be closed before the protective relay PR can be energized. This has the advantage that repeated opening of the switch HLPCS would require repeated operation of the reset switch, thus giving warning of a fault that should be corrected.

What is claimed is:

1. In a control circuit for a refrigeration system having a hermetically sealed refrigerant compressor, an electric motor within said compressor for driving said compressor, A.C. supply connections, and a magnetic starter having switching means for connecting said motor to said connections, the combination therewith of an overload relay having an energizing winding and having a safety switch that is closed when said winding is energized and is opened when said winding is deenergized, an A.C. to D.C. rectifier, a semiconductor having a positive temperature coefficient of resistance, means connecting said rectifier, said semiconductor and said winding in series to said connections, a cooling relay having a first switch which is closed when said cooling relay is deenergized and which is opened when said cooling relay is energized, said cooling relay having a second switch which is closed when said cooling relay is energized, a protective relay having third and fourth switches which are closed when said protective relay is energized, a reset switch, means including said first, said safety and said reset switches for connecting said protective relay to said connections, means including said reset switch for connecting said cooling relay to said connections, said last mentioned means including means for delaying the connection of said cooling relay to said connections until after said protective relay has been connected to said connections, means including said reset, safety and third switches for connecting said protective relay to said connections after said cooling relay has been energized and has opened said first switch, and means including said second and fourth switches for connecting said starter to said connections.

2. The invention claimed in claim 1 in which a thermostat is provided for turning said starter on and off, and in which said last mentioned means includes said thermostat.

3. The invention claimed in claim 2 in which said compressor is provided with a refrigerant pressure responsive switch, in which said means including said first, safety and reset switches for connecting said protective relay to said connections includes said pressure responsive switch, and in which said means including said reset, safety and third switches for connecting said protective relay to said connections includes said pressure responsive switch.

References Cited in the file of this patent

UNITED STATES PATENTS

| | | |
|---|---|---|
| 2,697,195 | Courtney | Dec. 14, 1954 |
| 2,818,535 | Skeats | Dec. 31, 1957 |
| 2,891,386 | Winter | June 23, 1959 |
| 2,898,746 | Mobarry | Aug. 11, 1959 |
| 2,905,388 | Galavics | Sept. 22, 1959 |

FOREIGN PATENTS

| | | |
|---|---|---|
| 522,731 | Belgium | Sept. 30, 1953 |
| 735,755 | Great Britain | Aug. 31, 1955 |